United States Patent
Rarey (10) Patent No.: US 9,987,997 B2
(45) Date of Patent: Jun. 5, 2018

(54) APPARATUS FOR SECURING OBJECTS

(71) Applicant: John David Rarey, Columbia, KY (US)

(72) Inventor: John David Rarey, Columbia, KY (US)

(*) Notice: Subject to any disclaimer, the term of this patent is extended or adjusted under 35 U.S.C. 154(b) by 0 days. days.

(21) Appl. No.: 15/417,099

(22) Filed: Jan. 26, 2017

(65) Prior Publication Data

US 2017/0267187 A1   Sep. 21, 2017

Related U.S. Application Data (60) Provisional application No. 62/309,261, filed on Mar. 16, 2016.

(51) Int. Cl.
| | |
|---|---|
| *B60R 9/08* | (2006.01) |
| *B60R 9/045* | (2006.01) |
| *B60R 9/048* | (2006.01) |

(52) U.S. Cl.
CPC ............... *B60R 9/08* (2013.01); *B60R 9/045* (2013.01); *B60R 9/048* (2013.01)

(58) Field of Classification Search
CPC .. B60R 9/12; B60R 9/08; B60R 9/045; B60R 9/048; B60R 9/042; B60R 9/052
USPC ...................... 224/323, 917.5, 310
See application file for complete search history.

(56) References Cited

U.S. PATENT DOCUMENTS

| | | | |
|---|---|---|---|
| 3,242,704 A * | 3/1966 | Barreca ................ | A63C 11/007 211/70.5 |
| 3,877,624 A | 4/1975 | Carson | |
| 4,162,755 A | 7/1979 | Bott | |
| 4,262,834 A * | 4/1981 | Nutt ...................... | B60R 9/0485 182/127 |
| 4,673,119 A | 6/1987 | Bott | |
| 4,867,362 A | 9/1989 | Finnegan et al. | |
| 5,282,562 A | 2/1994 | Legault | |
| 5,395,024 A | 3/1995 | Luchtenberg | |
| 5,421,495 A | 6/1995 | Bubik et al. | |
| 5,598,959 A | 2/1997 | Lorensen et al. | |
| 5,673,831 A | 10/1997 | Spratt | |
| 5,820,004 A | 10/1998 | Lane | |
| 5,884,824 A | 3/1999 | Spring, Jr. | |
| 5,988,470 A | 11/1999 | Siciliano | |
| 5,993,137 A * | 11/1999 | Harr ..................... | B60P 1/5433 212/238 |
| 6,427,888 B1 | 8/2002 | Condon et al. | |
| 6,827,244 B1 | 12/2004 | Stapleton et al. | |
| 7,357,451 B2 * | 4/2008 | Bendure ............... | B60N 2/2869 297/256.12 |
| 8,136,709 B2 * | 3/2012 | Jeli ......................... | B60R 9/12 224/316 |
| 2002/0117523 A1 | 8/2002 | Ketterhagen | |
| 2003/0201288 A1 | 10/2003 | Ford et al. | |

(Continued)

FOREIGN PATENT DOCUMENTS

WO   WO2006059076 A2   6/2006

*Primary Examiner* — Adam Waggenspack (74) *Attorney, Agent, or Firm* — Manatt, Phelps & Phillips, LLP (57) ABSTRACT

A multifunctional rack configured to secure various objects is described herein. The multifunctional rack is configured to be adjusted to secure various objects of varying size and number. The multifunctional rack is configured to secure and/or lock objects within the rack.

13 Claims, 5 Drawing Sheets

(56) References Cited

U.S. PATENT DOCUMENTS

2011/0079621 A1 4/2011 Byers et al.
2016/0280114 A1* 9/2016 Baxter, Jr. .............. B60R 9/042

* cited by examiner

APPARATUS FOR SECURING OBJECTS

CROSS-REFERENCE TO RELATED APPLICATIONS

This application claims priority to U.S. Provisional Patent Application No. 62/309,261 entitled "AUTOMOBILE UNIVERSAL ROOF RACK FOR HAULING KAYAKS, CANOES, SURF BOARDS, BICYCLES, SNOW SKIS AND BOARDS" filed Mar. 16, 2016. U.S. Provisional Patent Application No. 62/309,261 is hereby expressly incorporated by reference herein.

BACKGROUND

Technical Field

This disclosure relates to a rack configured to secure various objects and, more particularly, relates to a rack configured to secure various objects of varying size, dimension, and number.

Description of Related Art

When people travel, they will typically have a need to carry, haul, or transport various items. One way in which people transport their items is by attaching a rack to the roof of their vehicle. The rack can usually secure a specific item to the roof of the vehicle. However, the racks of the past have not had multifunctional uses and could not secure items of varying size, dimension, and number to the roof of a vehicle. As such, there is a need for a multifunctional rack that secures various objects of varying size and number.

SUMMARY

One aspect of the disclosure is a multifunctional rack for securing at least one object. In this embodiment, the rack includes two substantially parallel upper arm members. The upper arm members can be partially, substantially, or fully covered by at least one grip cushion. The rack can also include two substantially parallel lower arm members. The lower arm members can be partially, substantially, or fully covered by at least one grip cushion. The rack can also include at least three hinges configured to couple the two upper arm members and the two lower arm members. In another embodiment, each of the at least three hinges can include two components, one component for each of the two upper arm members and one component for each of the lower arm members. The rack can also include a center arm member coupled to and disposed between the two lower arm members. The rack can also include a clamping mechanism coupled to the two lower arm members. The rack can also include a pivot clamp coupled to the two upper arm members and configured to couple to the clamping mechanism. The rack can also include a locking mechanism configured to lock the clamping mechanism.

Another aspect of the disclosure is a rack for securing at least one object. In this embodiment, the rack can include a plurality of upper arm members. The plurality of upper arm members can be substantially parallel relative to each other upper arm member. In another embodiment, the rack includes a plurality of lower arm members. The plurality of lower arm members can be substantially parallel relative to each other lower arm member. The rack can also include at least one hinge configured to couple the plurality of upper arm members and the plurality of lower arm members.

Another aspect of the invention is a rack for securing at least one object. In this embodiment, the rack includes a plurality of upper arm members. In another embodiment, the rack includes a plurality of lower arm members coupled to the plurality of upper arm members via at least one hinge. The plurality of lower arm members can be coupled to at least one swivel plate. The at least one swivel plate can rotate about an axis substantially perpendicular to the plurality of lower arm members. In another embodiment, the rack includes at least one center arm member coupled to the plurality of lower arm members and disposed between the plurality of lower arm members. In another embodiment, the rack includes a clamping mechanism coupled to the plurality of lower arm members.

DETAILED DESCRIPTION

As will be appreciated by one skilled in the art, there are numerous ways of carrying out the examples, improvements, and arrangements of a multifunctional rack for securing various objects in accordance with embodiments disclosed herein. Although reference will be made to the illustrative embodiments depicted in the drawings and the following description, these embodiments are not meant to be exhaustive of the various alternative designs and embodiments that are encompassed by the disclosed invention. Those skilled in the art will readily appreciate that various modifications may be made, and various combinations can be made, without departing from the invention.

The term "arm," as used herein, may refer to any physical structure that is substantially rigid. For example, an arm could be a support member or structure of a multifunctional rack that is substantially longer than the arm is in diameter or circumference. Other examples include a cross bar, a cross member, and/or other types of support structures.

The term "member," as used herein, may refer to a component of a multi-component structure. For example, a member could be an arm of a multi-arm structure.

The term "multifunctional," as used herein, may refer to having or fulfilling multiple functions and/or purposes. For example, the rack disclosed herein can be used for multiple functions and/or purposes. Examples of the functions and/or purposes of the rack include securing kayaks, canoes, bicycles, surf boards, water skis, snow skis, snow boards, and/or other objects.

The terms "pivotable," as used herein, may refer to having the capability to pivot.

One embodiment relates to a multifunctional rack for securing various objects. The multifunctional rack is configured to be disposed on the roof of an automobile. The multifunctional rack, also referred to as a "rack" herein, is a universal roof rack system that can attach to the original equipment manufacturer and/or aftermarket cross bars that most sport utility vehicles, vans, cross over vehicles, and other vehicles are equipped with. The multifunctional rack can be configured to secure various objects including, but not limited to, kayaks, canoes, surf boards, bicycles, water skis, snow skis, snow boards, and various other types of equipment and objects. The multifunctional rack can be configured and/or adjusted to secure various types of objects without needing to replace the rack with a different type of rack to secure different objects.

The multifunctional rack includes various components. The components include a base bracket that attaches to the original equipment manufacturer or aftermarket vehicle cross bar(s). The base bracket can include stabilizer rails that are configured to stabilize the rack and/or secure the rack to the cross bar(s) of the vehicle. The base brackets are configured to couple to various cross bar shapes, designs, and/or styles. The stabilizer rails of the base brackets can be similar or identical to one another.

The base brackets can also couple to a lower swivel plate using at least one bolt. The lower swivel plate can be secured by using at least one large flathead bolt that extends from the bottom of the lower swivel plate upwards through the lower swivel plate, a swivel bearing plate, and/or an upper swivel plate. The lower swivel plate is rotatable relative to the swivel bearing plate. The swivel bearing plate is rotatable relative to the upper swivel plate. The upper swivel plate is rotatable relative to the lower swivel plate. The lower swivel plate, swivel bearing plate, and/or the upper swivel plate extend across all of the lower cross members. In another embodiment, the lower swivel plate, swivel bearing plate, and/or the upper swivel plate extend across only a portion of the lower cross members or one of the lower cross members. The lower swivel plate, swivel bearing plate, and/or the upper swivel plate can be circular, square, rectangular, and/or another shape that efficiently creates a bearing-type assembly. The bearing-type assembly is configured to allow for reduced friction and rotation of the rack relative to the vehicle, the cross bar(s), and/or at least one stabilizer rail.

The upper swivel plate can be coupled to the lower cross members. The coupling can include bolts, screws, and/or another type of coupling piece(s). In one embodiment, the lower cross members are lower left and right arms. The lower left and right arms are included in a dual arm assembly. In another embodiment, the lower cross members can be covered by grip and/or protective cushions. The grip and/or protective cushions are configured to protect the cross members from wear and tear, friction, and/or other elements.

The rack includes at least one clamp face plate. The at least one clamp face plate can be secured near or at one end of the lower cross members. The at least one clamp plate face can include at least one hook and/or latch to secure a clamp handle. The at least one hook and/or latch can be a locking hook and/or latch. The clamp handle can be secured within the at least one hook/latch and locked to the at least one clamp face plate.

A center arm assembly is positioned between the plurality of lower cross members near the clamp face plate and/or locking mechanism. The rack can also include a quick release push/pull pin on each side of the center arm assembly. The quick release push/pull pins stabilize, secure, and/or lock the adjustable center arm assembly. The center arm assembly can be secured using a plurality of pins, clamps, and/or bolts.

An adjustable hinge assembly can be coupled or fastened to the lower cross members near the opposite end of the at least one clamp face plate. The adjustable hinge assembly includes at least one hinge. The at least one hinge can include a single hinge, two hinges, three hinges, and/or any number of hinges. The at least one hinge includes upper hinge plates, clamps, pins, lower hinge plates, and a hinge connector. The lower hinge plates are coupled to the upper hinge plates via the hinge connector. The lower hinge plates, the upper hinge plates, and the hinge connector are adjustable and/or movable relative to one another. The lower hinge plates, the upper hinge plates, and the hinge connector can be secured and/or locked in position. Hinges are separable by a separation arm to maintain the distance between the hinges fixed.

The upper hinge plates and the lower hinge plates can be rotated and/or pivoted in a configuration that positions the upper cross members and the lower cross members closer in the locked/closed position than when in the unlocked/open position. The rotation and/or movability of the rack provides a multiple hinge configuration that assists in securing the object within the rack. In one embodiment, the hinges are positioned to maximize the space for an object that can be positioned in the rack. The hinges are movable and/or pivotable and can be secured and/or locked in position using the pins, bolts, and/or clamps.

In one embodiment, the lower cross members are coupled to the lower hinge plates. The lower hinge plates are coupled to the hinge connectors. The hinge connectors are coupled to the upper hinge plates. The upper hinge plates are coupled to the upper cross members. The lower hinge plates can be secured using at least one clamp and/or at least one quick push/pull pin for each lower cross member. The upper hinge plates can be secured using at least one clamp and/or at least one quick push/pull pin for each upper cross member. Each hinge is movable in the same plane. The plane is substantially parallel to the lower cross member associated with the lower hinge plate.

In another embodiment, upper cross members are covered by upper grip and/or protective cushions. The upper cross members are coupled to the adjustable hinge assembly. The upper cross members can also be coupled to an adjustable extension arm assembly. The adjustable extension arm assembly is positioned within the end opening(s) of the upper cross members. The adjustable extension arm assembly is adjustable by extending the assembly from within the upper arms in a position opposite the adjustable hinge assembly. At least one pin can hold, secure, and/or fasten the adjustable extension arm assembly in a desired location to secure the object(s) within the rack. A keyed locking mechanism installed on the clamp face plate can lock into position the clamp handle.

The clamp face plate and/or key lock can be configured in a locked and/or closed position. In the locked/closed position, the clamp handle is coupled to the clamp face plate and/or the hooks of the clamp face plate. The locked/closed position secures the rack so that the upper cross arms and/or hinges do not move substantially in the locked/closed position. In another embodiment, the center arm assembly is not movable when in the locked/closed position.

The clamp face plate and/or key lock can be configured in an unlocked and/or open position. In the unlocked/open position, the clamp handle is separated and/or uncoupled from the clamp face plate and/or the hooks of the clamp face plate. The unlocked/open position provides an opening for an object to be positioned between the upper cross arms and/or lower cross arms. Once the object is positioned, the rack can be placed in the locked/closed position. If not secured in the locked/closed position, the object can move substantially in the unlocked/open position. In another embodiment, the center arm assembly can move when in the unlocked/open position.

An object can be secured using the rack. For example, a bicycle can be secured to the rack. The bicycle can be secured by pulling the quick connect push/pull pins from the swivel plate, rotating the rack, and/or releasing the quick connect push/pull pins. A front rack can be rotated in a way that is substantially parallel to the length of the vehicle. In this configuration, the lower cross members and upper cross members of the front rack are substantially parallel to the length of the vehicle. A rear rack can be rotated in a way that is substantially parallel to the length of the vehicle. In this configuration, the lower cross members and upper cross members of the rear rack are substantially parallel to the length of the vehicle.

The front and rear racks can also be positioned so that the upper cross members are positioned in a perpendicular position relative to the roof of the vehicle. The perpendicular position of the upper cross members can be in a position that is greater than 0 degrees relative to the roof of the vehicle and less than 180 degrees relative to the roof of the vehicle. In another embodiment, the perpendicular position of the upper cross members can be in a position that is approximately 90 degrees relative to the roof of the vehicle. At least one rack (e.g., front rack) can be positioned near the front cross bars of the vehicle and at least one rack (e.g., rear rack) can be positioned near the rear cross bars of the vehicle. The quick connect push/pull pins can be pulled out and/or pushed in to extend and/or compress the adjustable extension arm. The adjustable extension arm can be used to effectively lengthen the upper cross members. The center arm assembly can also be locked and/or secured by using the quick connect push/pull pins in a similar way. Once the at least one rack is positioned in the above manner, the bicycle can be secured on the at least one rack and locked and/or secured into position.

Embodiments of a multifunctional rack for securing various objects are illustrated in FIGS. 1-8.

Figure 1:
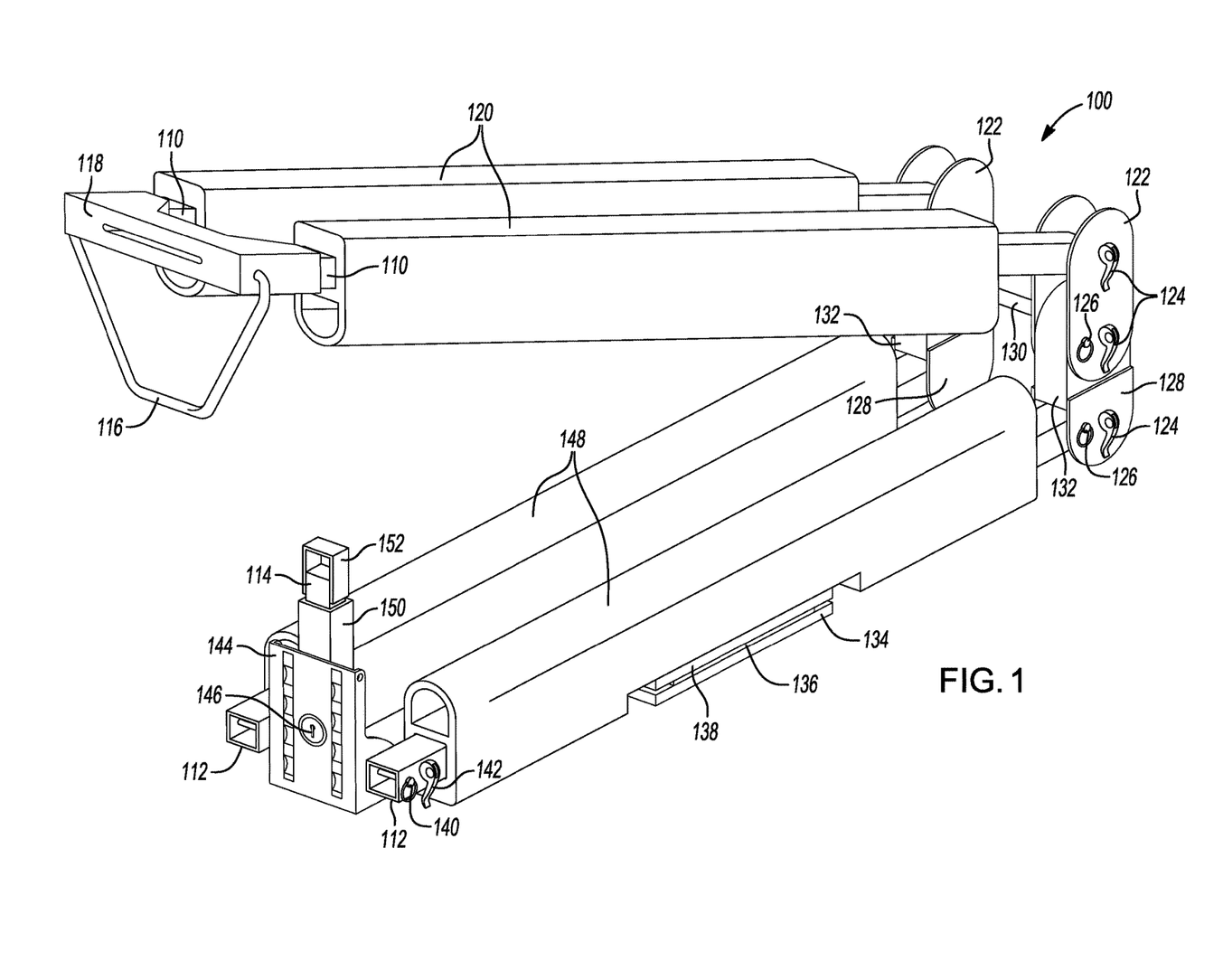
FIG. 1 illustrates a perspective view of a rack in accordance with an illustrative embodiment of the present invention.

FIG. 1 illustrates a perspective view of a rack 100. The rack 100 includes upper left and right arms 110, lower left and right arms 112, and a center arm 114. The upper left and right arms 110 are coupled to the lower left and right arms 112 via at least one hinge. The at least one hinge include upper hinge plates 122, clamps 124, pins 126, lower hinge plates 128, and a hinge connector 132. The hinge plates are separated by at least one separation arm 130.

In one embodiment, the upper left and rights arms 110 are coupled to the lower left and right arms 112 via a clamp handle 116 and a clamp face plate 144. In one embodiment, the coupling secures and/or locks the clamp handle 116 to the clamp face plate 144 via a key lock 146. In another embodiment, a clamping mechanism includes the clamp face plate 144.

The lower left and right arms 112 are coupled to an upper swivel plate 138, a center swivel plate poly washer 136, and a lower swivel plate 134. The upper swivel plate 138 is rotatable relative to the lower swivel plate 134. In some embodiments, the lower swivel plate 134 is coupled to stabilizer rails. The lower swivel plate 134 can be secured to the stabilizer rails. The lower swivel plate 134 can be static and/or non-movable during operation while secured to the stabilizer rails. In another embodiment, the lower swivel plate 134 can be dynamic and/or movable during operation while secured to the stabilizer rails.

In another embodiment, the upper swivel plate 138 is coupled to the lower left and right arms 112. The upper swivel plate 138 can be secured to the lower left and right arms 112 and/or lower arm grip cushions 148. The upper swivel plate 138 can be static and/or non-movable during operation while secured to the lower left and right arms 112 and/or the lower arm grip cushions 148. In another embodiment, the upper swivel plate 138 can be dynamic and/or movable during operation while secured to the lower left and right arms 112 and/or the lower arm grip cushions 148.

In one embodiment, the swivel plates are configured to rotate about an axis that is perpendicular to the lower left and right arms 112 and/or the upper left and right arms 110. The swivel plates are configured to provide full rotation about the axis. The upper swivel plate 138 can rotate relative to the lower swivel plate 134. In one embodiment, the rack 100 can rotate 360 degrees while the lower swivel plate 134 remains stationary and/or secured to the stabilizer rails.

In another embodiment, the rack 100 is configured to slide along the stabilizer rails via the lower swivel plate 134. The lower swivel plate 134 can slide along the stabilizer rails to provide alternative positioning of the rack 100. The sliding configuration supplements the rotational configuration. The sliding and rotational configuration provide for greater functionality for users. The rack 100 is configured as a multifunctional rack that can be configured in various configurations.

An arm cap 118 provides an end cap to the upper left and right arms 110. The arm cap 118 is coupled to the clamp handle 116 and the upper left and right arms 110. The clamp handle 116 is movable, adjustable, and/or rotatable relative to the arm cap 118. In one embodiment, the clamp handle 116 can be disposed at any position between the upper portion of the upper left and right arms 110 and the lower portion of the upper left and right arms 110 where space is available for the clamp handle 116. In another embodiment, the clamp handle 116 can be disposed at any position between the upper portion of upper arm grip cushions 120 and the lower portion of upper arm grip cushions 120 where space is available for the clamp handle 116. In another embodiment, the clamp handle 116 is coupled to the upper left and right arms 110.

In one embodiment, the upper left and right arms 110 are partially, substantially, and/or fully covered by upper arm grip cushions 120. In another embodiment, the lower left and right arms 112 are partially, substantially, and/or fully covered by lower arm grip cushions 148. In another embodiment, the center arm 114 is partially, substantially, and/or fully covered by a center arm grip cushion 150.

In one embodiment, the upper arm grip cushions 120 protect the upper left and right arms 110 against damage, wear and tear, erosion, rust, and other causes of damage to the arms. In another embodiment, the upper arm grip cushions 120 are made from at least one of the following materials: ceramic, fiberglass, insulator, Kevlar®, metal, neoprene, nylon, polycarbonate, polymer, rubber, plastic, polyvinyl chloride, and Teflon®. The upper arm grip cushions 120 protect the device being secured between the upper arm grip cushions 120, the lower arm grip cushions 148, and/or the center arm cushion 150. The upper arm grip cushions 120 also provide a grip material that allows for greater friction between the device being secured and the upper arm grip cushions 120, the lower arm grip cushions 148, and/or the center arm cushion 150. The friction assists with keeping the device being secured from moving while it is secured.

In one embodiment, the lower arm grip cushions 148 protect the lower left and right arms 112 against damage, wear and tear, erosion, rust, and other causes of damage to the arms. In another embodiment, the lower arm grip cushions 148 are made from at least one of the following materials: ceramic, fiberglass, insulator, Kevlar®, metal, neoprene, nylon, polycarbonate, polymer, rubber, plastic, polyvinyl chloride, and Teflon®. The lower arm grip cushions 148 protect the device being secured between the lower arm grip cushions 148, the upper arm grip cushions 120, and/or the center arm cushion 150. The lower arm grip cushions 148 also provide a grip material that allows for greater friction between the device being secured and the lower arm grip cushions 148, the upper arm grip cushions 120, and/or the center arm cushion 150. The friction assists with keeping the device being secured from moving while it is secured.

In one embodiment, the center arm grip cushion 150 protects the center arm 114 against damage, wear and tear, erosion, rust, and other causes of damage to the arms. In another embodiment, the center arm grip cushion 150 is made from at least one of the following materials: ceramic, fiberglass, insulator, Kevlar®, metal, neoprene, nylon, polycarbonate, polymer, rubber, plastic, polyvinyl chloride, and Teflon®. The center arm grip cushion 150 protects the device being secured between the center arm grip cushion 150, the lower arm grip cushions 148, and/or the upper arm grip cushions 120. The lower arm grip cushions 148 also provide a grip material that allows for greater friction between the device being secured and the center arm cushion 150, the lower arm grip cushions 148, and/or the upper arm grip cushions 120. The friction assists with keeping the device being secured from moving while it is secured.

The center arm 114 and clamp face plate 144 are coupled to the lower left and right arms 112. In one embodiment, the center arm 114 and/or clamp face plate 144 are coupled via pin 140 and/or clamp 142. In one embodiment, the center arm 114 includes at least one hole for pin 140 and/or clamp 142 configured to couple the center arm 114, the clamp face plate 144, and/or the lower left and right arms 112. In one embodiment, the center arm 114, the clamp face plate 144, and/or the lower left and right arms 112 are rotatable and/or movable relative to the pin 140 and/or the clamp 142. In another embodiment, the center arm 114, the clamp face plate 144, and/or the lower left and right arms 112 are stationary and/or not rotatable and/or movable relative to the pin 140 and/or the clamp 142.

A center arm bracket 152 is coupled to the center arm 114. The center arm bracket 152 is configured to secure an object within the rack 100. The center arm bracket 152 is movable and/or pivotable relative to the center arm 114.

Figures 2, 3:
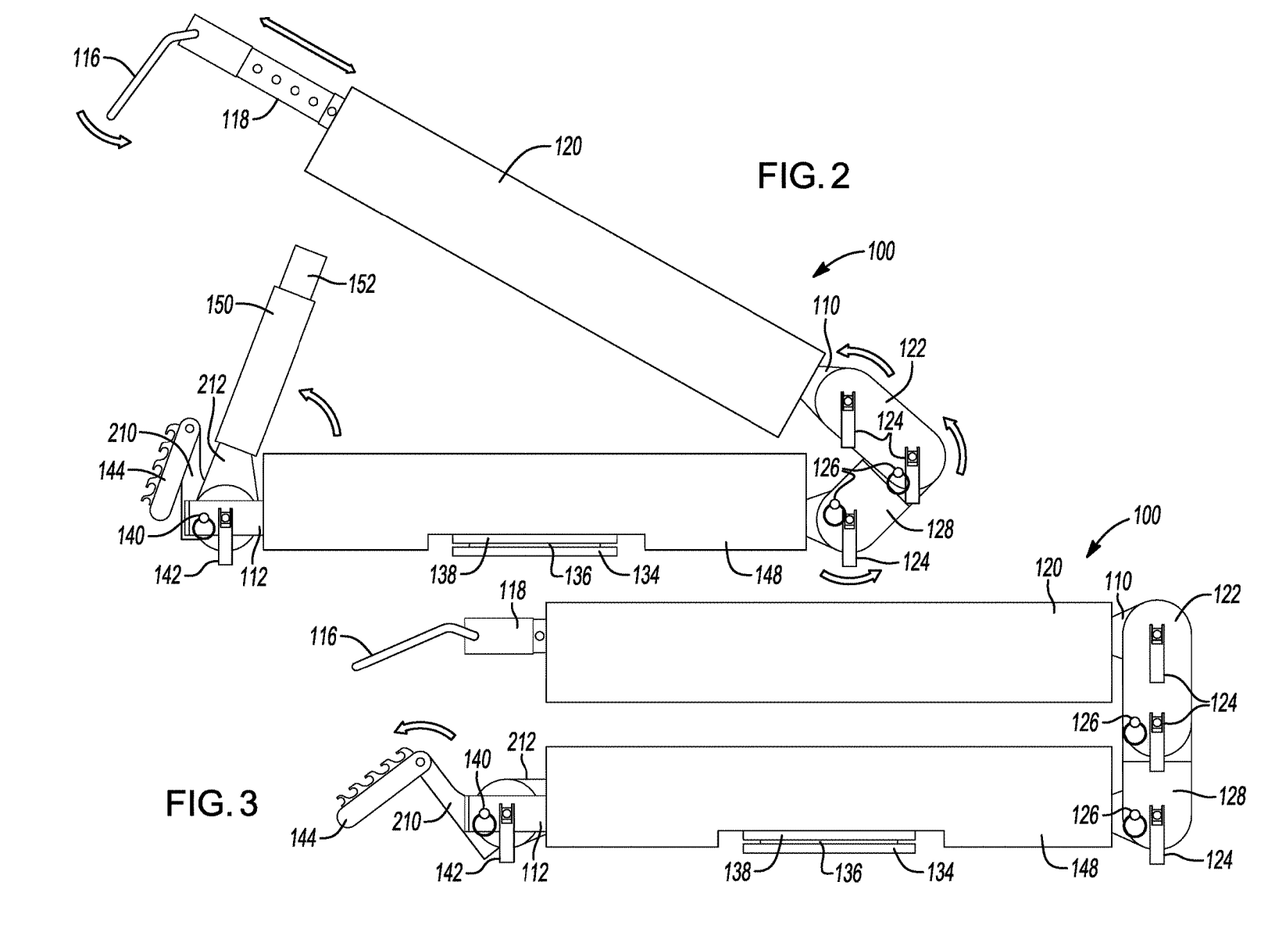
FIG. 2 illustrates a side view of a rack in accordance with an illustrative embodiment of the present invention.
FIG. 3 illustrates a side view of a rack in accordance with an illustrative embodiment of the present invention.

FIG. 2 illustrates a side view of the rack 100. The rack 100 illustrates components described elsewhere in this application. Those components include similar features and characteristics as well as the additional characteristics described below. Additionally, FIG. 2 illustrates a clamp rear plate 210 and center arm brackets 212.

In the configuration of FIG. 2, the arm cap 118 is partially and/or fully extended from the upper left and right arms 110. In one embodiment, the arm cap 118 is an adjustable extension arm assembly. Additionally, the center arm brackets 212, the center arm grip cushion 150, and the center arm bracket 152 are partially rotated towards the lower arm grip cushions 148. Additionally, the upper hinge plates 122 and the lower hinge plates 128 are rotated and/or pivoted in a configuration that positions the upper left and rights arms 110 and the lower left and right arms 112 closer together. This configuration assists with better securement of the particular object being secured.

Clamp rear plate 210 is configured to assist with securing the rack 100. Clamp rear plate 210 is movable relative to the clamp face plate 144, the lower left and right arms 112, and the center arm brackets 212. In one embodiment, the clamp handle 116 can be disposed in one of the latches and/or hooks on the clamp face plate 144. The hinge coupling the clamp face plate 144 and the clamp rear plate 210 can secure the clamping mechanism by disposing the clamping mechanism towards the center arm brackets 212. The clamp handle 116 becomes secured in one of the latches and/or hooks on the clamp face plate 144. In one embodiment, a locking mechanism can be used to lock and/or secure the clamp handle 116 in position.

Center arm bracket 212 is configured to move relative to the lower left and right arms 112. In one embodiment, the center arm bracket 212 secures the object in the rack 100. In another embodiment, the center arm bracket 212 is configured to fold, move, and/or be secured between the lower left and right arms 112 and/or the lower arm grip cushions 148.

In some embodiments, the arm cap 118 is extendable from the upper left and right arms 110. The arm cap 118 includes predefined holes and/or insertion points for pins, bolts, and/or clamps. The holes and/or insertion points are configured to receive a pin, bolt, and/or clamp to secure the arm cap 118 in position.

In one embodiment, the clamp face plate 144 is configured to receive the clamp handle 116 at multiple latch positions. The latches can be a latch, hook, fastener, catch, clasp, lock, and/or another comparable latching component configured to receive the clamp handle 116. The latches are also configured to secure the clamp handle 116 when secured and/or locked into position by a locking mechanism.

In another embodiment, the upper hinge plates 122, the lower hinge plates 128, the clamps 124, and the pins 126 are configured to rotate and/or move relative to one another and/or the upper left and right arms 110 and the lower left and right arms 112. The rotation and/or movability provides a multiple hinge configuration that assists in securing the object within the rack 100.

FIG. 3 illustrates a side view of a rack 100. The rack 100 illustrates components described elsewhere in this application. Those components include similar features and characteristics as well as the additional characteristics described below.

In the configuration of FIG. 3, the arm cap 118 is collapsed and/or compressed into the upper left and right arms 110. Additionally, the center arm brackets 212, the center arm grip cushion, and the center arm bracket are rotated towards the lower arm grip cushions 148. The center arm brackets 212, the center arm grip cushion, and the center arm bracket are disposed between the lower left and rights arms 112. Additionally, the upper hinge plates 122 and the lower hinge plates 128 are aligned in a configuration that positions the upper left and rights arms 110 and the lower left and right arms 112 further apart. This configuration may assist with better securement of the particular object being secured.

In this embodiment, the center arm brackets 212, the center arm grip cushion, and the center arm bracket are disposed between the lower left and rights arms 112. This position provides additional space within the rack 100 for the object to be positioned. The positions of the center arm brackets 212, the center arm, and other components of the rack 100 can be chosen for various reasons, such as to maximize space for the object, tightly secure the object, loosely secure the object, secure multiple objects, and secure various and different objects. Other reasons for the positioning of the various components may exist.

Figure 4:
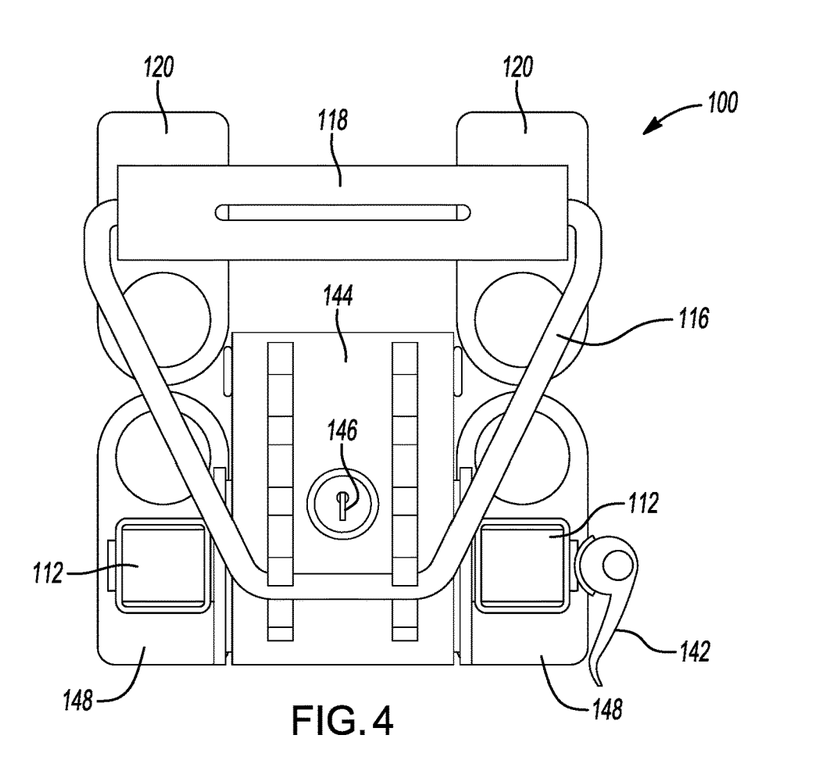
FIG. 4 illustrates a front view of a rack in accordance with an illustrative embodiment of the present invention.

FIG. 4 illustrates a front view of a rack 100. The rack 100 illustrates components described elsewhere in this application. Those components include similar features and characteristics as well as the additional characteristics described below.

In the configuration of FIG. 4, the rack 100 is secured and/or locked in a closed position. Although an object is not shown in this configuration, the rack 100 can secure the object between the upper left and right arms and the lower left and right arms. The upper arm grip cushions 120 and the lower arm grip cushions 148 are positioned to be in contact or almost in contact with one another. The clamp handle 116 is secured within one of the latches of the clamp face plate 144.

Figures 5, 6:
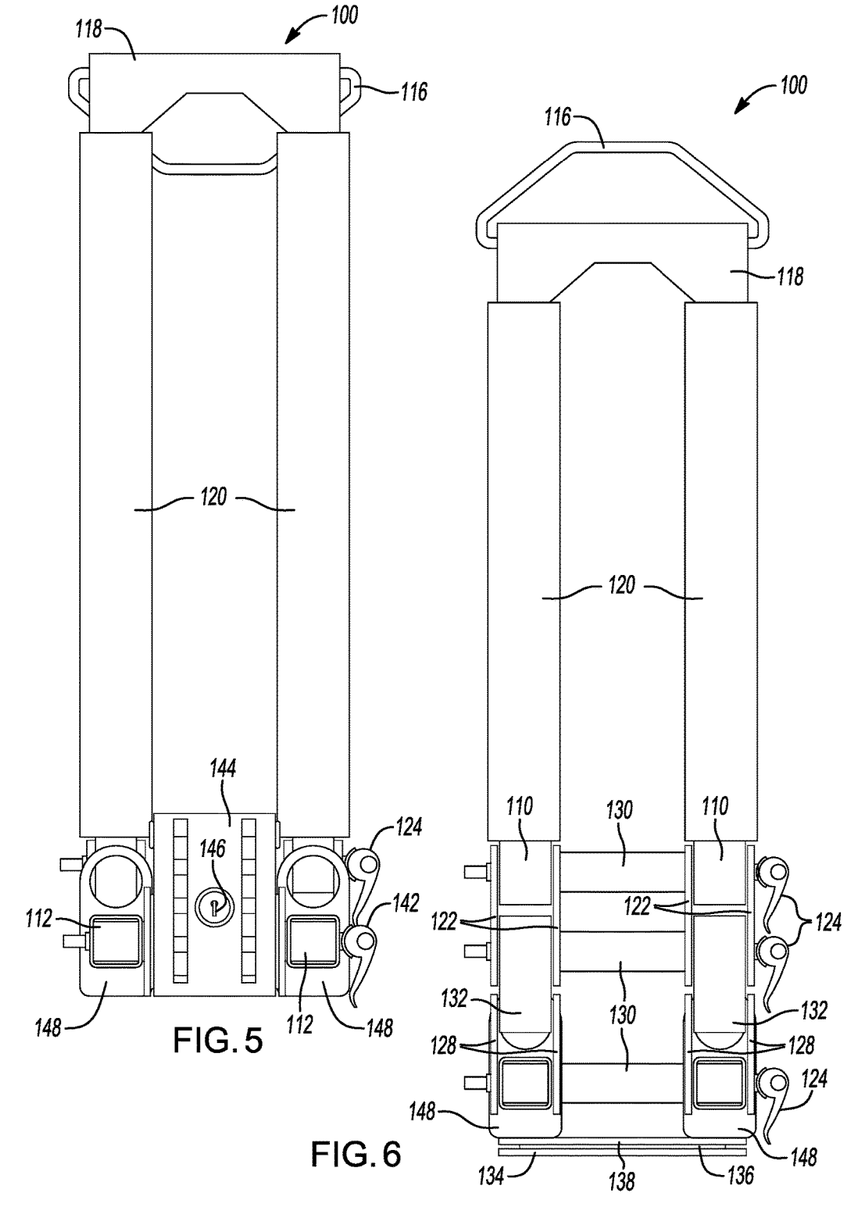
FIG. 5 illustrates a front view of a rack in accordance with an illustrative embodiment of the present invention.
FIG. 6 illustrates a back view of a rack in accordance with an illustrative embodiment of the present invention.

FIG. 5 illustrates a front view of a rack 100. The rack 100 illustrates components described elsewhere in this application. Those components include similar features and characteristics as well as the additional characteristics described below.

In the configuration of FIG. 5, the rack 100 is in an open position and ready to receive an object. Although not shown in this configuration, an object can be positioned on the lower left and right arms. With an object positioned on the lower left and right arms, the upper left and right arms can be lowered against the object. Once the upper left and rights arms are lowered against the object, the rack 100 can be secured and/or locked in a closed position using the clamp handle 116, the clamp face plate 144, and/or the key lock 146.

FIG. 6 illustrates a back view of a rack 100. The rack 100 illustrates components described elsewhere in this application. Those components include similar features and characteristics as well as the additional characteristics described below.

In the configuration of FIG. 6, the rack 100 is in an open position and ready to receive an object. The hinges are configured to maximize the space for an object that can be positioned in the rack 100. The hinges are movable and/or pivotable and can be secured and/or locked in position using the pins, bolts, and/or clamps.

Figure 7:
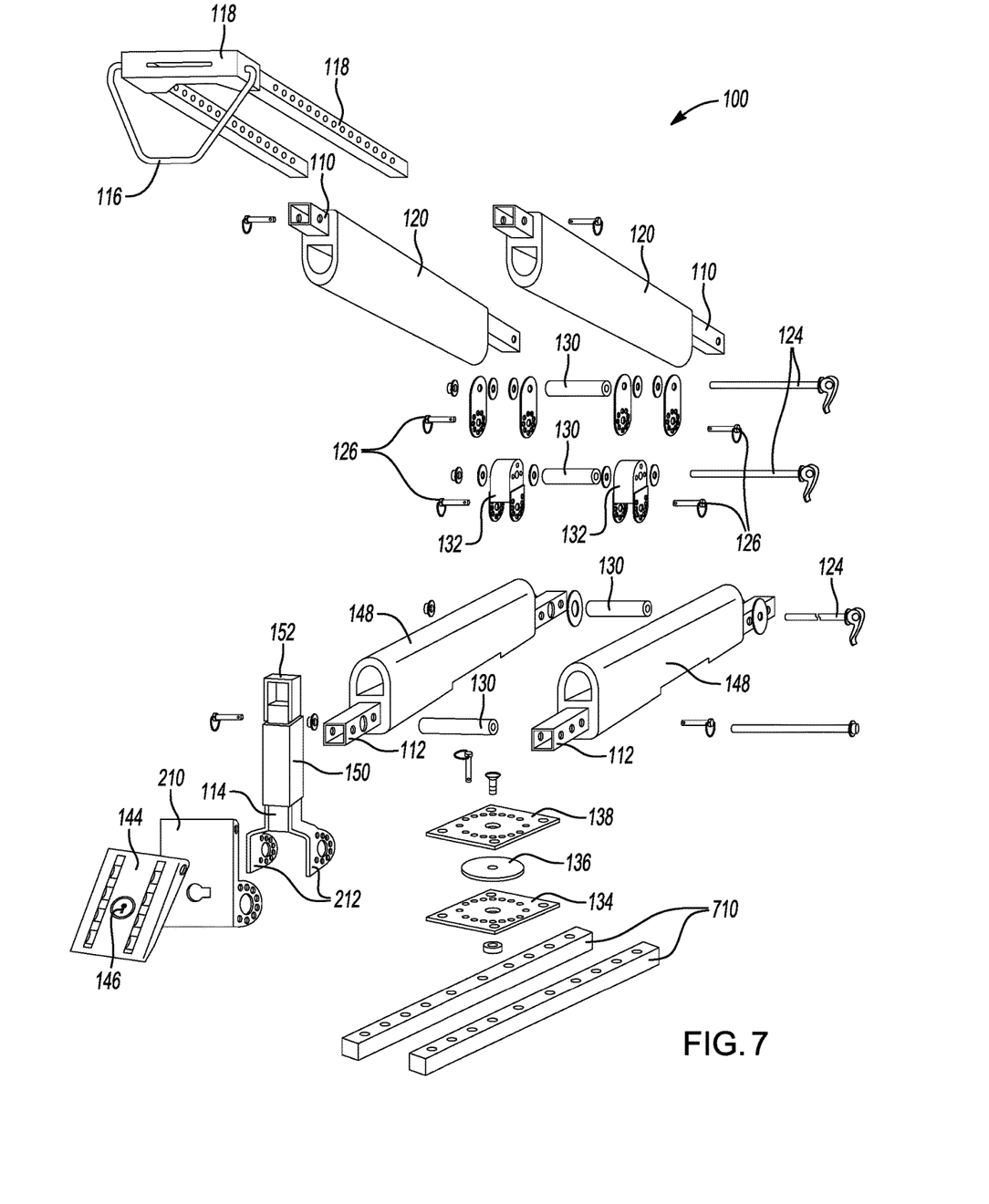
FIG. 7 illustrates an exploded view of a rack in accordance with an illustrative embodiment of the present invention.

FIG. 7 illustrates an exploded view of a rack 100. The rack 100 illustrates components described elsewhere in this application. Those components include similar features and characteristics as well as the additional characteristics described below. Additionally, FIG. 7 illustrates stabilizer rails 710.

Stabilizer rails 710 are configured to couple to the swivel plates. In one embodiment, the stabilizer rails 710 are coupled to the lower swivel plate 134. The stabilizer rails 710 include various predefined holes and/or insertion points for coupling of the lower swivel plate 134, the center swivel plate poly washer 136, and/or the upper swivel plate 138. In one embodiment, the stabilizer rails 710 are configured to couple the rack 100 to the roof of a vehicle.

Figure 8:
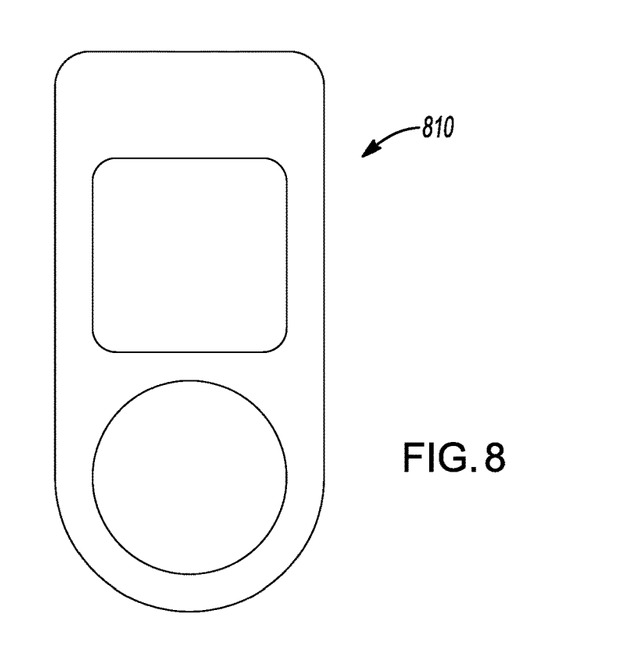
FIG. 8 illustrates a front view of a grip cushion of a rack in accordance with an illustrative aspect of the present invention.

FIG. 8 illustrates a front view of a grip cushion 810 of a rack 100. The grip cushion 810 is configured to provide padding for an object, friction to secure the object in place, and/or protection for an arm. The square portion of the grip cushion 810 is configured to tightly abut an arm. The circular portion of the grip cushion 810 is configured to remain open and provide flexibility and cushioning. As more pressure is applied by the arm against the circular portion of the grip cushion 810, the circular portion can compress and/or provide more friction and/or grip so that the object can be secured.

In addition to functional features, the grip cushion 810 provides ornamental features. For example, the grip cushion 810 is designed to be aesthetically pleasing.

Implementations disclosed herein provide an apparatus for a multifunctional rack configured to secure an object. One skilled in the art will recognize that these embodiments may be implemented in various hardware configurations such as described herein, equivalent to the descriptions herein, and/or substantially similar to the descriptions herein.

It should be noted that the terms "couple," "coupling," "coupled," or other variations of the word couple as used herein may indicate either an indirect connection or a direct connection. For example, if a first component is "coupled" to a second component, the first component may be either indirectly connected to the second component or directly connected to the second component.

As used herein, the term "plurality" denotes two or more. For example, a plurality of components indicates two or more components.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, mechanical components/devices may be shown without the entire apparatus in order not to obscure the examples in unnecessary detail. In other instances, such components, other structures, and techniques may be shown in detail to further explain the examples.

Headings are included herein for reference and to aid in locating various sections. These headings are not intended to limit the scope of the concepts described with respect thereto. Such concepts may have applicability throughout the entire specification.

The description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A multifunctional rack for securing at least one object, the multifunctional rack includes:
   two substantially parallel upper arm members partially, substantially, or fully covered by at least one grip cushion;
   two substantially parallel lower arm members partially, substantially, or fully covered by at least one grip cushion;
   at least one hinge configured to couple the two upper arm members and the two lower arm members, wherein the at least one hinge includes at least two components, a first component coupled to each of the two upper arm members and a second component, and the second component coupled to each of the lower arm members and the first component, wherein the first component and the second component each include at least two pivot points, wherein the first component and the second component share at least one of the at least two pivot points, wherein the first component includes first hinge plates separated by at least a first separation arm the first separation arm located entirely between the two upper arm members and the second component includes second hinge plates separated by at least a second separation arm the second separation arm located entirely between the two lower arm members;

a center arm member coupled to and disposed between the two lower arm members;

a clamping mechanism coupled to the two lower arm members;

a pivot clamp coupled to the two upper arm members and configured to couple to the clamping mechanism; and a locking mechanism configured to lock the clamping mechanism.

2. The multifunctional rack of claim 1, wherein the two upper arm members are coupled to an arm cap, wherein the arm cap is extendable from the two upper arm members and is coupled to the pivot clamp.

3. The multifunctional rack of claim 1, wherein the two lower arm members are coupled to at least one swivel plate, wherein the at least one swivel plate is rotatable about an axis substantially perpendicular to the two lower arm members.

4. The multifunctional rack of claim 3, wherein the at least one swivel plate includes a top swivel plate, a center swivel plate, and a lower swivel plate, wherein the lower swivel plate is configured to couple to at least one stabilizer rail.

5. The multifunctional rack of claim 1, wherein the at least one hinge includes at least one hinge plate configured to lock via at least one of pins, bolts, and clamps received into predefined holes in the at least one hinge plate.

6. The multifunctional rack of claim 1, wherein the center arm member is disposed between the two upper arm members.

7. The multifunctional rack of claim 1, wherein the clamping mechanism includes a clamp rear plate.

8. A rack for securing at least one object, the rack includes:

a plurality of upper arm members, wherein the plurality of upper arm members are substantially parallel relative to each other upper arm member;

a plurality of lower arm members, wherein the plurality of lower arm members are substantially parallel relative to each other lower arm member; and at least one hinge configured to couple the plurality of upper arm members and the plurality of lower arm members, wherein the at least one hinge includes at least two components, a first component coupled to the plurality of upper arm members and a second component, and the second component coupled to the plurality of lower arm members and the first component, wherein the first component and the second component each include at least two pivot points, wherein the first component and the second component share at least one of the at least two pivot points, wherein the first component includes first hinge plates separated by at least a first separation arm the first separation arm located entirely between the two upper arm members and the second component includes second hinge plates separated by at least a second separation arm the second separation arm located entirely between two adjacent lower arm members of the plurality of lower arm members; a center arm member coupled to and disposed between two of the lower arm members of the plurality of lower arm members; a clamping mechanism coupled to the two lower arm members; a pivot clamp coupled to two of the plurality of upper arm members and configured to couple to the clamping mechanism; and a locking mechanism configured to lock the clamping mechanism.

9. The rack of claim 8, further includes a center arm member coupled to and disposed between the plurality of lower arm members, a clamping mechanism coupled to the plurality of lower arm members, a pivot clamp coupled to the plurality of upper arm members and configured to couple to the clamping mechanism, and a locking mechanism configured to lock the clamping mechanism.

10. The rack of claim 9, wherein the center arm member is disposed between the plurality of lower arm members.

11. The rack of claim 8, wherein the plurality of upper arm members and the plurality of lower arm members have grip cushions partially, substantially, or fully covering the arm members.

12. The rack of claim 8, wherein the at least one hinge includes at least one hinge plate, wherein the at least one hinge is lockable via inserting at least one of pins, bolts, and clamps into predefined holes in the at least one hinge plate.

13. The rack of claim 8, wherein the at least one hinge is configured to pivot and become secured via inserting at least one of pins, bolts, and clamps into predefined holes in at least one hinge plate.

* * * * *